United States Patent
Usui

(10) Patent No.: US 6,563,865 B1
(45) Date of Patent: May 13, 2003

(54) COMMUNICATION APPARATUS

(75) Inventor: Takashi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/288,976

(22) Filed: Apr. 9, 1999

(30) Foreign Application Priority Data

Apr. 17, 1998 (JP) ............................................. 10-108261

(51) Int. Cl.[7] ................................................ H04B 1/38
(52) U.S. Cl. ...................................... 375/222; 375/260
(58) Field of Search ................................. 375/222, 260, 375/348, 349, 219, 295, 316; 370/206, 207, 208, 480, 482; 708/403, 404, 405; 455/73

(56) References Cited

U.S. PATENT DOCUMENTS

| 5,297,070 A | * | 3/1994 | Hua et al. | 708/404 |
| 5,606,575 A | | 2/1997 | Williams | 375/219 |
| 5,724,380 A | * | 3/1998 | Ritter | 375/135 |
| 5,787,123 A | * | 7/1998 | Okada et al. | 375/324 |
| 5,889,759 A | * | 3/1999 | McGibney | 370/207 |
| 6,122,703 A | * | 9/2000 | Nasserbakht | 711/5 |

FOREIGN PATENT DOCUMENTS

EP 673131 1/1992 ............. H04L/5/06

OTHER PUBLICATIONS

O'Neil, Rorie and Luis B. Lopes, A Study of Novel OFDM Transmission Schemes for use in Indoor Environments. Vehicular Technology Conference, 1996. Mobil Technology for the Human Race., IEEE 46th Atlanta, GA, USA Apr. 28–May 1, 1996, New York, NY, USA IEEE, US Apr. 28, 1996, pp. 909–913, XP010162521 ISBN: 0–7803–3157–5.

* cited by examiner

Primary Examiner—Stephen Chin
Assistant Examiner—Chieh M. Fan
(74) Attorney, Agent, or Firm—Jay H. Maioli

(57) ABSTRACT

In a modulator/demodulator for modulating and demodulating a signal, transmission data and reception data are selected, data selected is set in an input register, Fourier-transform-processing or inverse-Fourier-transform processing is conducted on the data set in the input register, data of an N point (N is an arbitrary integer) processed is set in an output register, and an order to read out data of the N point set in the output register of Fourier transform circuit is specified, whereby transmission and reception processing for the signal can be carried out by a simple circuit arrangement having only one set of Fourier transform circuits.

12 Claims, 7 Drawing Sheets

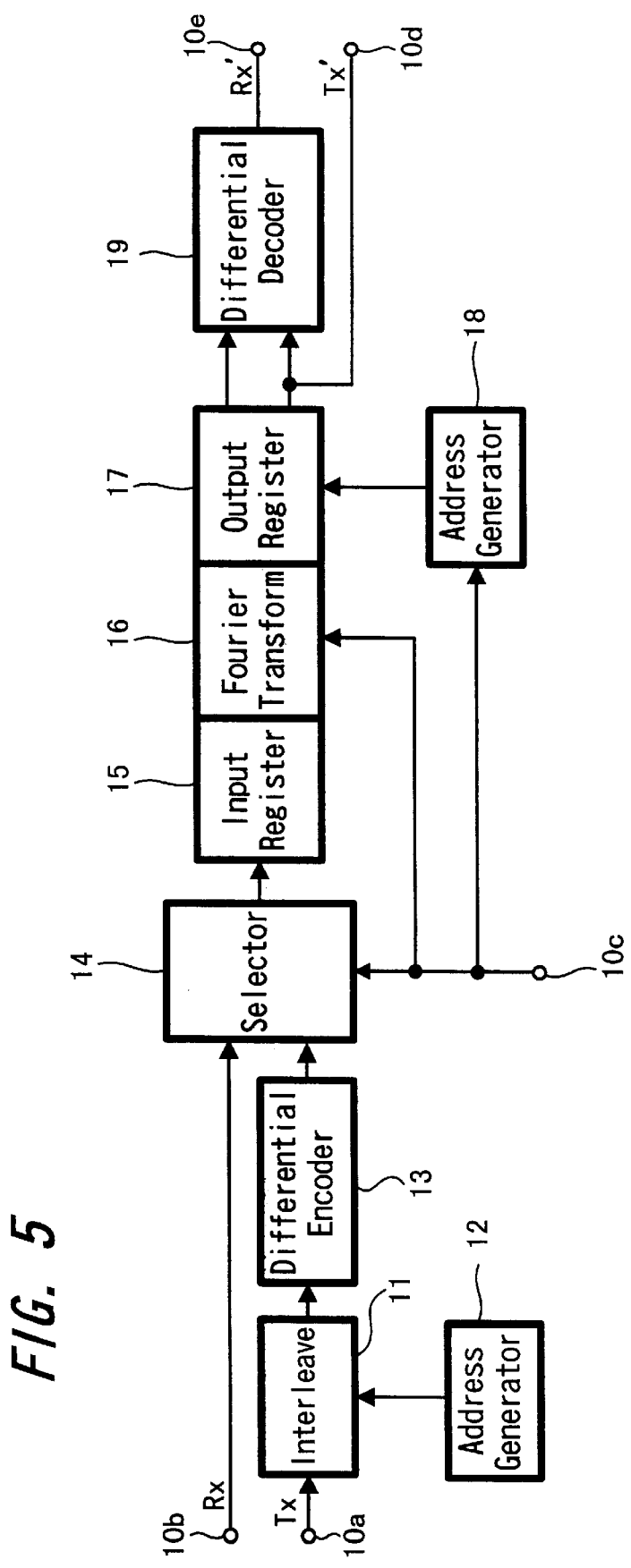

COMMUNICATION APPARATUS

BACKGROUND OF THE INVENTION

1. Field of the Invention

The present invention relates to a communication apparatus for transmitting a signal subjected to orthogonal frequency division multiplex (hereafter referred to as OFDM) modulation and receiving a signal subjected to OFDM modulation.

2. Description of the Related Art

An OFDM modulation has been put to practical use as one of modulation methods for transmitting digital data of a comparatively large amount by radio or the like. For example, in a comparatively narrow region, such as in a home or in an office, as shown in FIG. 1, a video signal (digital video data) outputted by a video signal source 1 including a tuner for receiving television broadcasting and a reproducing device for reproducing a video program recorded on a recording medium is supplied to a radio transmitting device 2. The video signal is subjected to modulation processing in the radio transmitting device 2. A resultant OFDM modulated signal is subjected to radio transmission in a predetermined frequency band from an antenna 3. The radio-transmitted signal is subjected to receiving processing in a radio receiving device 5 connected to an antenna 4. The OFDM wave of the received frequency band is subjected to demodulation processing to yield a video signal. The received video signal is supplied to a video recording and reproducing device 6, and recorded on a predetermined recording medium such as video tape. Or the received video signal is supplied to a television receiver 7, and subjected to picture receiving processing. In this case, it is also possible to reproduce the video signal recorded by the video recording and reproducing device 6, and supply the reproduced signal to the television receiver 7.

In such a system configuration, radio transmission between the antenna 3 connected to the radio transmitting device 2 and the antenna 4 connected to the radio receiving device 5 is conducted by using a signal subjected to OFDM modulation. As a result, radio transmission of digital data of a large amount can be conducted favorably and efficiently. The OFDM modulation method is a method for transmitting transmission data as a multi-carrier distributed among a plurality of sub-carriers. Radio transmission of data of a large amount can be conducted efficiently by this modulator method.

An example of a configuration for conducting OFDM modulation for transmission in the radio transmitting device 2 is shown in FIG. 2. A transmission signal (digital data) obtained at an input terminal 2a is supplied to a serial-parallel converter 2b, and converted to parallel data every predetermined unit. The parallel data obtained from the serial-parallel converter 2b is supplied to a memory 2c for interleave. By changing the order of writing to the memory 2c and the order of reading from the memory 2c, interleave processing for changing the data arrangement is conducted. The parallel data subjected to the interleave processing is supplied to an inverse Fourier transform circuit (IFFT circuit) 2d. By using computation processing using an inverse fast Fourier transform, orthogonal transform processing for transforming the time axis to the frequency axis is conducted. The parallel data subjected to the orthogonal transform is supplied to a parallel-serial converter 2e. Resultant serial data is supplied to an output terminal 2f. The data obtained at the output terminal 2f is frequency-converted to a predetermined transmission frequency band by a transmitting processing system, and subjected to radio transmission.

An example of a configuration for receiving a signal thus radio-transmitted and demodulating the signal in the radio receiving device 5 is shown in FIG. 3. A signal of a predetermined frequency band is received, and frequency-converted to an intermediate frequency signal or the like. The intermediate frequency signal is obtained at an input terminal 5a. The data obtained at the input terminal 5a is converted to parallel data at every predetermined unit by a serial-parallel converter 5b. The converted output is supplied to a Fourier transform circuit (FFT circuit) 5c. By using computation processing using fast Fourier transform, orthogonal transform processing for transforming a frequency axis to a time axis is conducted in the Fourier transform circuit 5c. The parallel data subjected to the orthogonal transform is supplied to a memory 5d for de-interleave. By changing the order of writing to the memory 5d and the order of reading from the memory 5d, de-interleave processing for changing the data arrangement and restoring the original data arrangement is conducted. The parallel data subjected to the de-interleave processing is converted to serial data by a parallel-serial converter 5e, and the serial data is supplied to an output terminal 5f.

Thus, each of the modulation configuration at the time of transmission of the signal and the demodulation configuration at the time of reception of the OFDM signal is a circuit configuration of a comparatively large scale. The communication apparatus for transmitting and receiving the OFDM signal has a problem that the circuit scale becomes large. In other words, each of the inverse Fourier transform circuit for generating an OFDM modulated signal by computation processing of inverse Fourier transform at the time of transmission and the Fourier transform circuit for demodulating the OFDM modulated signal by computation processing of Fourier transform at the time of reception needs a circuit having a configuration of a large scale, resulting in a large-sized circuit scale. Furthermore, in the case where interleave is conducted prior to transmission as shown in FIGS. 2 and 3, memories for interleave processing and de-interleave processing are also needed. Thus, the radio communication apparatus for transmitting and receiving the OFDM signal has a problem that the circuit scale becomes very large.

SUMMARY OF THE INVENTION

An object of the present invention is to make it possible to conduct the processing for generating the OFDM modulated signal at the time of transmission and the processing for demodulating the OFDM modulated signal at the time of reception by using a simple configuration.

In order to solve the problems, in accordance with the present invention, inverse Fourier transform processing for transmission and Fourier transform processing for reception are conducted in one Fourier transform circuit, and when reading out data which is set in an output register of the Fourier transform means and forming serial data, the data is read out at the time of transmission in an order different from an order in which the data is read out at the time of reception.

In accordance with the present invention, processing for modulating a signal to produce an OFDM modulated signal at the time of transmission and processing for demodulating the OFDM modulated signal at the time of reception are conducted by a set of Fourier transform circuits and other circuits connected before and behind the Fourier transform circuits.

BRIEF DESCRIPTION OF THE DRAWINGS

FIG. 5 is a block diagram showing modulation and demodulation processing of an OFDM signal according to the first embodiment of the present invention;

DESCRIPTION OF THE PREFERRED EMBODIMENTS

Hereafter, a first embodiment of the present invention will be described by referring to FIGS. 4 through 6.

In the present example, the present invention has been applied to a radio communication apparatus for conducting the transmission processing and reception processing of the OFDM modulated signal. This radio communication apparatus conducts two-way radio communication with another radio communication apparatus.

Figure 4:
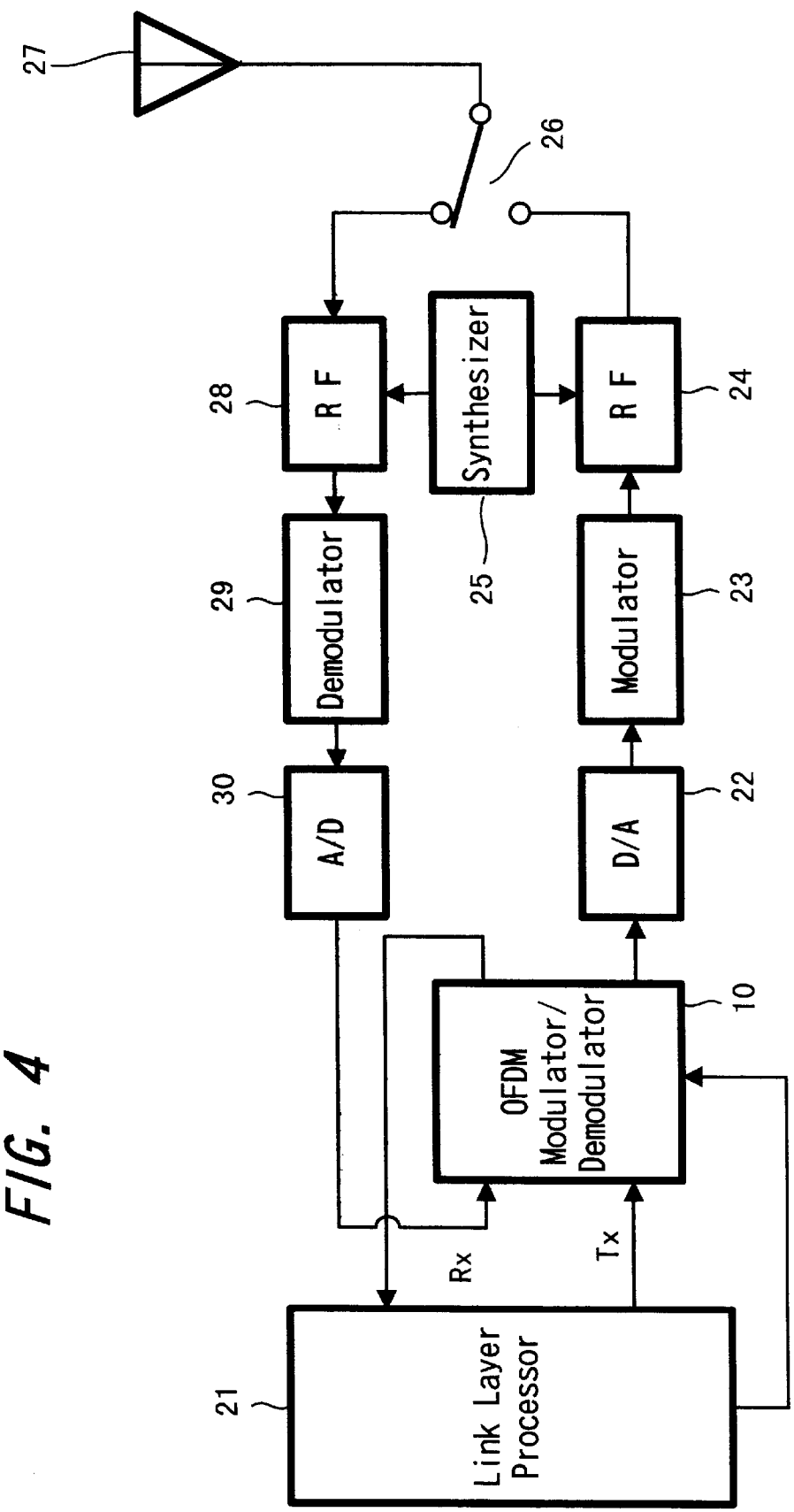
FIG. 4 is a block diagram showing an example of the entire configuration according to a first embodiment of the present invention.

FIG. 4 shows the entire configuration of the radio communication apparatus of the present example. Transmission processing and reception processing are controlled by a link layer processor 21. As for a configuration for transmission, transmission data Tx outputted from the link layer processor 21 is supplied to an OFDM modulator/demodulator 10, and OFDM modulated transmission data is obtained. Although the configuration of the OFDM modulator/demodulator 10 will be described later, the OFDM modulator/demodulator 10 is a circuit for conducting OFDM modulation processing and processing associated with it at the time of transmission and OFDM demodulation processing and processing associated with it at the time of reception.

The transmission data subjected to OFDM modulation in the OFDM modulator/demodulator 10 is converted to an analog signal by a digital-analog converter 22. The converted output is subjected to modulation processing for radio transmission by a modulator unit 23. The modulated signal is mixed with a frequency signal supplied from a synthesizer 25 by a transmission high frequency unit 24, thereby frequency-converted to a transmission frequency. The signal is supplied to an antenna 27 via an antenna switchover switch 26, and subjected to radio transmission.

Furthermore, in a reception system, OFDM modulated data is supplied from the antenna 27 to a reception high frequency unit 28 via the antenna switchover switch 26, mixed with a frequency signal supplied from the synthesizer 25, and thereby frequency-converted to an intermediate frequency signal (or a baseband signal). The frequency-converted signal is supplied to a demodulator 29 and subjected to demodulation processing. The signal demodulated by the demodulator 29 is converted to digital data by an analog-digital converter 30. The OFDM modulated received data Rx converted to digital data is subjected to OFDM demodulation processing by the OFDM modulator/demodulator unit 10. The received data subjected to the OFDM demodulation in the OFDM modulator/demodulator 10 is subjected to required reception processing by the link layer processor 21.

The configuration of the OFDM modulator/demodulator 10 in the present embodiment will now be described by referring to FIG. 5. The transmission data Tx supplied from the link layer processor 21 to an input terminal 10a is supplied to an interleave unit 11. The interleave unit 11 conducts interleave processing for rearranging the data arrangement of the transmission data $T_x$ for transmission. The interleave unit 11 is formed of a shift register having a plurality of stages. By rearranging an order of reading out data which is set in the shift register equivalent to an order corresponding to an interleave pattern, the interleave processing is conducted. The order of reading out data from the shift register is set on the basis of address data supplied from an address generator 12.

The transmission data interleaved is subjected to differential encoding processing by a differential encoder 13. The differential encoded transmission data is supplied to a first input terminal of a selector 14. Furthermore, the received data Rx supplied from the analog-digital converter 30 to an input terminal 10b is supplied to a second input terminal, of the selector 14. The selector 14 is supplied with a transmission/reception selection signal from the link layer processor 21 via a terminal 10c. When transmission is selected by this selection signal, the selector 14 selects the transmission data supplied to the first input terminal, and outputs it. When reception is selected by the selection signal, the selector 14 selects the received data supplied to the second input terminal, and outputs it.

The data selected and outputted by the selector 14 (transmission data or received data) is supplied to an input register 15 provided in an input part of a Fourier transform circuit 16. The input register 15 is a register in which data of as many stages as points converted by the Fourier transform circuit 16 (here, N points, where N is an integer, such as 64 points) can be set. The data which has been set in the input register 15 is supplied to the Fourier transform circuit 16 at predetermined timing, and subjected to Fourier transform processing or inverse Fourier transform processing. The Fourier transform circuit 16 is supplied with the transmission/reception selection signal from the link layer processor 21 via the terminal 10c. When transmission is selected by this selection signal, computation processing of inverse fast Fourier transform is conducted in the Fourier transform circuit 16. When reception is selected by the selection signal, computation processing of fast Fourier transform is conducted in the Fourier transform circuit 16.

In the computation processing using the inverse fast Fourier transform at the time of transmission, orthogonal transform processing for transforming data arranged on the time axis to data arranged on the frequency axis is conducted. For example, if transform processing of N points (here, 64 points) is conducted, the transformed data is set in an output register 17 as parallel data of N points (64 points).

If the number of transform points is 64 when the inverse Fourier transform is conducted in the Fourier transform circuit 16, transform equation of the inverse Fourier transform processing is represented by the following expression (1).

$$y_n = \sum_{k=0}^{63} x_k e^{j\frac{2\pi kn}{64}} \quad (1)$$

In the computation processing using the fast Fourier transform at the time of reception, orthogonal transform processing for transforming data arranged on the frequency axis to data arranged on the time axis is conducted. For example, if transform processing of N points (here, 64 points) is conducted, the transformed data is set in the output register 17 as parallel data of N bits (64 bits).

If the number of transform points is 64 when the Fourier transform is conducted in the Fourier transform circuit 16, transform equation of the Fourier transform processing is represented by the following expression (2).

$$y_n = \sum_{k=0}^{63} x_k e^{j2\pi kn/64} \quad (2)$$

Figure 6A:
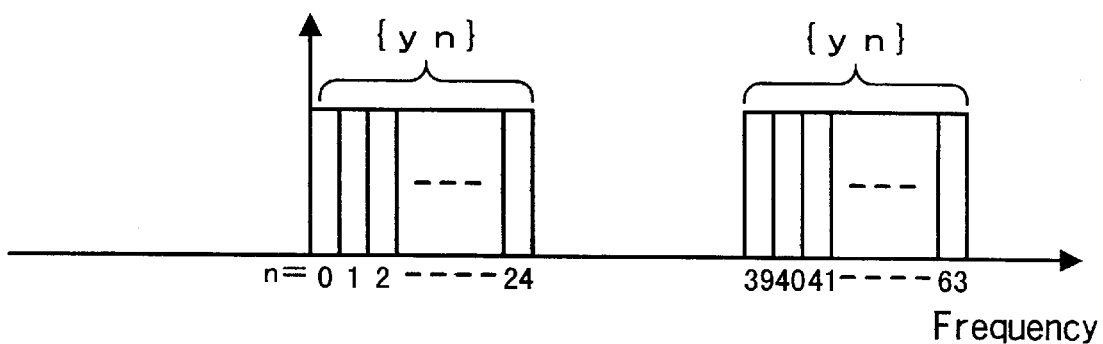
FIGS. 6A and 6B are each a diagram exemplifying frequency spectra of an OFDM signal according to the first embodiment of the present invention.
Figure 6B:
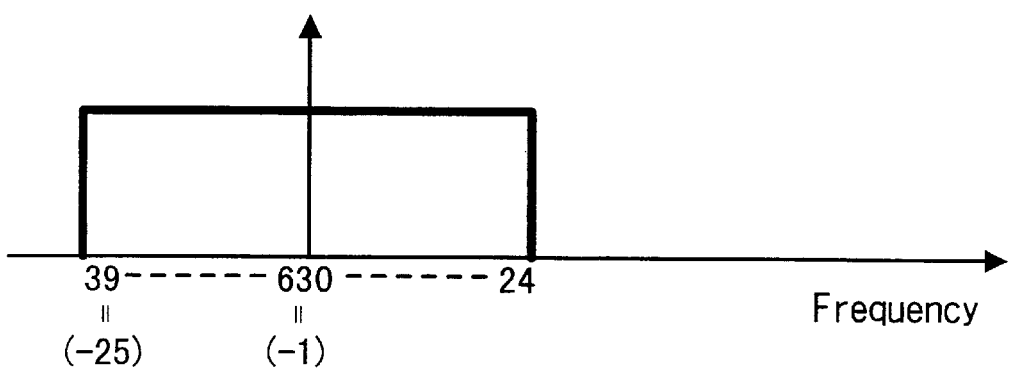

Each of the OFDM modulated signal thus generated by the inverse Fourier transform processing and the OFDM modulated signal demodulated by the Fourier transform processing becomes a signal having, for example, frequency spectra shown in FIG. 6A. In other words, for example, input data ($X_k$) to the Fourier transform circuit 16 at the time of modulation (at the time of transmission) become data of n=0 to 24 arranged on the frequency axis and data of n=39 to 63 arranged on the frequency axis. In the frequency spectra of the example shown in FIG. 6A, the data are separated into two groups. As shown in FIG. 6B, however, the frequency spectra is equivalent to one continuous spectrum around k=0. If representation using a continuous spectrum is used as shown in FIG. 6B, transform equation of Fourier transform becomes the following expression (3).

$$y_n = \sum_{k=-25}^{24} x_k e^{j\frac{22kn}{64}} \quad (3)$$

The parallel data subjected to the inverse Fourier transform or Fourier transform in the Fourier transform circuit. 16 and set in the output register 17 is read out in an order based upon the address data supplied from an address generator 18, and converted to serial data. The address generator 18 is supplied with the transmission/reception selection signal from the link layer processor 21 via the terminal 10c. When transmission is selected by this selection signal, the address generator unit 18 supplies address data set for transmission to the output register 17. When reception is selected by the selection signal, the address generator unit 18 supplies address data set for transmission to the output register 17. When reception is selected by the selection signal, the address generator unit 18 supplies address data set for reception to the output register 17.

The order which is set in the address generator 18 of the present example for transmission is formed so as to specify addresses of N series (64 series) of the output register 17 one after another. When parallel data of, for example, 64 series is represented by $y_0$ to $y_{63}$, however, the same address is repeatedly specified in the present example for 4 head series, i.e., $y_{60}$ to $y_{63}$ and 4 tail series, i.e., $y_0$ to $y_3$. That is, for those series, therefore, the same data is repeatedly outputted. That is, for 8 head samples and 8 tail samples, data of repetitive waveforms are obtained. Transmission data $T_x{}'$ having guard intervals added thereto is thus obtained.

The order which is set in the address generator 18 of the present example for reception is formed so as to specify addresses of N series (64 series) of the output register 17 in an order corresponding to a de-interleave pattern for recovering from the interleave conducted on the transmission data and restoring the original state. As for the configuration for generating the address data in such an order, the address data may be generated by, for example, count processing in a counter, or address data may be set in a register beforehand in an order corresponding to the interleave pattern. In the case of the present example, data is outputted as serial data of one series at the time of transmission, and data is outputted as serial data of two series when the data is outputted from the output register 17 at the time of reception.

The serial data of one series outputted at the time of transmission in the order specified by the address generator 18 is supplied to an output terminal 10d of the OFDM modulated transmission data Tx', and supplied to the digital-analog converter 22 shown in FIG. 4 via the terminal 10d. Furthermore, serial data of the two series outputted at the time of reception in the order specified by the address generator 18 are supplied to a differential decoder 19 in which differential decoding processing is conducted on the data of the two series. Differential-decoded received data Rx' by the differential decoder 19 is supplied to an output terminal 10e, and supplied to the link layer processor 21 shown in FIG. 4 via the terminal 10e.

Owing to the configuration of the present embodiment, the processing for generating the OFDM modulated signal at the time of transmission and the processing for demodulating the OFDM signal at the time of reception are conducted by the OFDM modulator/demodulator 10 which is a common circuit. It is thus unnecessary to prepare separate circuits for modulation of the OFDM signal and for demodulation of the OFDM signal. Therefore, the configuration of the communication apparatus for transmitting and receiving the OFDM signal can be simplified. Especially in the case of the configuration of the present embodiment, processing for adding guard intervals to the transmission data at the time of transmission is conducted by setting the output order for conversion of data which has been set in the output register of the Fourier transform circuit to serial data. Therefore, a separate circuit for adding the guard intervals for transmission is not required. In addition, de-interleave processing for restoring the arrangement of the received data to the original state is conducted at the time of reception. Therefore, a separate de-interleave processing circuit for reception is not required. As a result, the circuit configuration can be further simplified.

Figure 7:
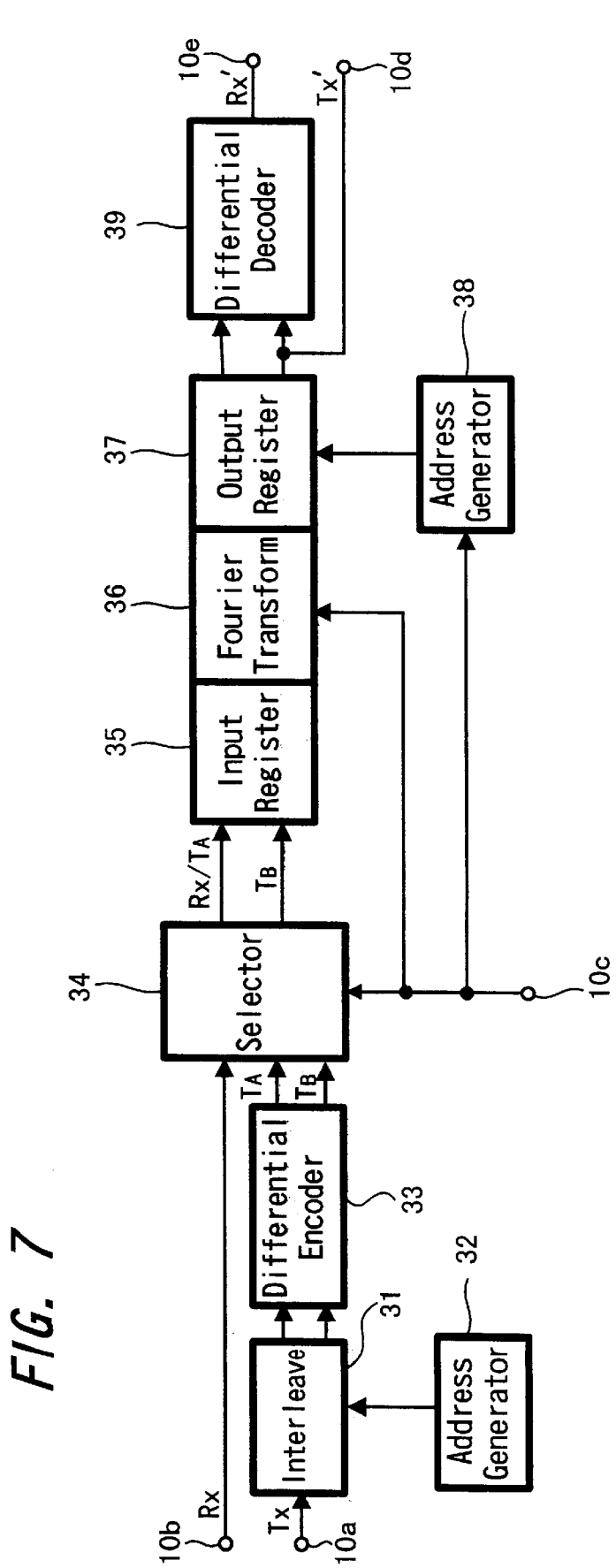
FIG. 7 is a block diagram showing modulation and demodulation processing of an OFDM signal according to a second embodiment of the present invention.

A second embodiment of the present invention will now be described by referring to FIG. 7.

In the present example as well, the present invention is applied to a radio communication apparatus for conducting transmission processing and reception processing of an OFDM modulated signal in the same way as the above described first embodiment. This radio communication apparatus is an apparatus for conducting two-way radio communication with another radio communication apparatus.

The entire configuration of the communication apparatus according to the present embodiment is the same as the configuration of FIG. 4 described with reference to the first embodiment. In the present embodiment, the OFDM modulator/demodulator 10 has a configuration shown in FIG. 7.

Hereafter, the configuration of the OFDM modulator/demodulator will be described by referring to FIG. 7. The transmission data Tx supplied from the link layer processor 21 to an input terminal 10a is supplied to an interleave unit 31. The interleave unit 31 conducts interleave processing for rearranging the data arrangement of the transmission data for transmission. The interleave unit 31 is formed of a shift register having a plurality of stages. By rearranging an order of reading out data which is set in the shift register equivalent to an order corresponding to an interleave pattern, the interleave processing is conducted. The order of reading out data from the shift register is set on the basis of address data supplied from an address generator 32. In the case of the present embodiment, the shift register forming the interleave unit 31 is divided into a former half and a latter half. From the two shift registers, data are read out simultaneously in an order corresponding to each interleave pattern. From the interleave unit 31, data of two series are simultaneously outputted.

The transmission data of the two series interleaved by the interleave unit 31 are simultaneously supplied to a differential encoder 33, and subjected to differential encoding processing. Respective differential encoded transmission data TA and TB are supplied to a first input terminal of a selector 34. Furthermore, the received data Rx supplied from the analog-digital converter 30 to an input terminal 10b is supplied to a second input terminal of the selector 34. The selector 34 is supplied with a transmission/reception selection signal from the link layer processor 21 via a terminal 10c. When transmission is selected by this selection signal, the selector 34 selects the transmission data supplied to the first input terminal, and outputs it. When reception is selected by the selection signal, the selector 34 selects the received data supplied to the second input terminal, and outputs it.

The data selected and outputted by the selector 34 (transmission data or received data) is supplied to an input register 35 provided in an input part of a Fourier transform circuit 36. The input register 35 is a register in which data of as many stages as points converted by the Fourier transform circuit 36 (here, N points, where N is an integer, such as 64 points) can be set. In this case, in the case of transmission data, data of the two series are simultaneously supplied to the input register 35. For example, data of a first series is set in the former half of the register 35, and data of a second series is set in the latter half of the register 35. The data which has been set in the input register 35 is supplied to the Fourier transform circuit 36 at predetermined timing, and subjected to Fourier transform processing or inverse Fourier transform processing. The Fourier transform circuit 36 is supplied with the transmission/reception selection signal from the link layer processor 21 via the terminal 10c. When transmission is selected by this selection signal, computation processing of inverse fast Fourier transform is conducted in the Fourier transform circuit 36. When reception is selected by the selection signal, computation processing of fast Fourier transform is conducted in the Fourier transform circuit 36.

In the computation processing using the inverse fast Fourier transform at the time of transmission, the Fourier transform circuit 36 conducts orthogonal transform processing for transforming data arranged on the time axis to data arranged on the frequency axis. For example, if the Fourier transform circuit 36 conducts transform processing of N points (here, 64 points), the transformed data is set in an output register 37 as parallel data of N points (64 points).

In the computation processing using the fast Fourier transform at the time of reception, orthogonal transform processing for transforming data arranged on the frequency axis to data arranged on the time axis is conducted. For example, if the Fourier transform circuit 36 conducts transform processing of N points (here, 64 points), the transformed data is set in the output register 37 as parallel data of N points (64 points).

The parallel data subjected to the inverse Fourier transform or Fourier transform in the Fourier transform circuit 36 and set in the output register 17 is read out in an order based upon the address data supplied from an address generator 38, and converted to serial data. The address generator 38 is supplied with the transmission/reception selection signal from the link layer processor 21 via the terminal 10c. When transmission is selected by this selection signal, the address generator unit 38 supplies address data set for transmission to the output register 37. When reception is selected by the selection signal, the address generator unit 38 supplies address data set for reception to the output register 37.

The order which is set in the address generator 38 of the present example for transmission is formed so as to specify addresses of N series (64 series) of the output register 17 in order. When parallel data of, for example, 64 series is represented by $y_0$ to $y_{63}$, however, the same address is repeatedly specified in the present example for 4 head series, i.e., $y_{60}$ to $y_{63}$ and 4 tail series, i.e., $y_0$ to $y_3$. For those series, therefore, the same data is repeatedly outputted. That is, for 8 head samples and 8 tail samples, data of repetitive waveforms are obtained. Transmission data $T_x'$ having guard intervals added thereto is thus obtained.

The order which is set in the address generator 38 of the present example for reception is formed so as to specify addresses of N series (64 series) of the output register 37 in an order corresponding to a de-interleave pattern for recovering from the interleave conducted on the transmission data and restoring the original state. As for the configuration for generating the address data in such an order, the address data may be generated by, for example, count processing in a counter, or address data may be set in a register beforehand in an order corresponding to the interleave pattern. In the case of the present example, data is outputted as serial data of one series at the time of transmission, and data is outputted as serial data of two series when the data is outputted from the output register 37 at the time of reception.

The serial data of one series outputted at the time of transmission in the order specified by the address generator 38 is supplied to an output terminal 10d of the OFDM modulated transmission data $T_x'$, and supplied to the digital-analog converter 22 shown in FIG. 4 via the terminal 10d. Furthermore, serial data of the two series outputted at the time of reception in the order specified by the address generator 38 are supplied to a differential decoder 39 in which differential decoding processing is conducted on the data of the two series. Differential-decoded received data $R_x'$ by the differential decoder 39 is supplied to an output terminal 10e, and supplied to the link layer processor 21 shown in FIG. 4 via the terminal 10e.

Other portions are formed in the same way as the apparatus described above with reference to the first embodiment. The OFDM modulated signal generated by the inverse Fourier transform and demodulated by the Fourier transform processing is also the same as the OFDM modulated signal of the first embodiment described above by referring to FIG. 6.

Owing to the configuration of the present embodiment, the processing for generating the OFDM modulated signal at the time of transmission and the processing for demodulating the OFDM signal at the time of reception are conducted by the OFDM modulator/demodulator 10 which is a common circuit in the same way as the first embodiment described above. It is thus unnecessary to prepare separate circuits for modulation of the OFDM signal and for demodulation of the OFDM signal. Therefore, the configuration of the communication apparatus for transmitting and receiving the OFDM signal can be simplified. And in the case of the present embodiment, transmission data is divided into data of two series and subjected to the interleave processing by the interleave unit 31, at the time of processing of the transmission data. The data of the two series are simultaneously set in the input register 35 of the Fourier transform circuit 36. (For example, data of a first series is set in the former half of the input register 35. In addition, data of a second series is set in the latter half of the input register 35.) As a result, the time for setting the transmission data in the input register 35 can be reduced to half as compared to the prior art. The time required for the OFDM modulation processing of the transmission data can be shortened correspondingly.

Figure 8:
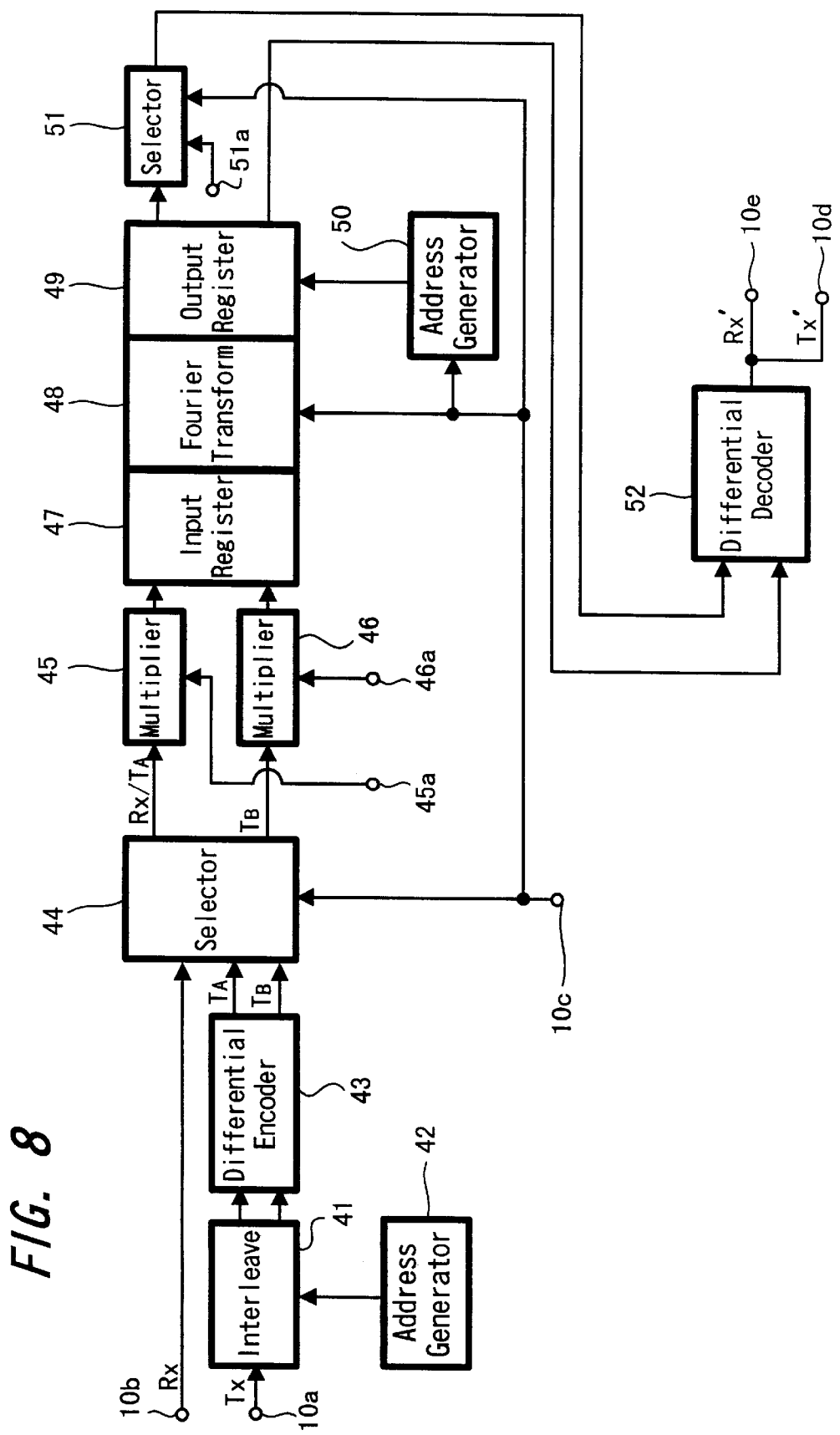
FIG. 8 is a block diagram showing modulation and demodulation processing of an OFDM signal according to a third embodiment of the present invention.

A third embodiment of the present invention will now be described by referring to FIG. 8.

In the present example as well, the present invention is applied to a radio communication apparatus for conducting transmission processing and reception processing of an OFDM modulated signal in the same way as the above described first and second embodiments. This radio communication apparatus is an apparatus for conducting two-way radio communication with another radio communication apparatus.

The entire configuration of the communication apparatus according to the present embodiment is the same as the configuration of FIG. 4 described with reference to the first embodiment. In the present embodiment, the OFDM modulator/demodulator 10 has a configuration shown in FIG. 8.

Hereafter, the configuration of the OFDM modulator/demodulator will be described by referring to FIG. 8. The transmission data Tx supplied from the link layer processor 21 to an input terminal 10a is supplied to an interleave unit 41. The interleave unit 41 conducts interleave processing for rearranging the data arrangement of the transmission data for transmission. The interleave unit 41 is formed of a shift register having a plurality of stages. By rearranging an order of reading out data which is set in the shift register equivalent to an order corresponding to an interleave pattern, the interleave processing is conducted. The order of reading out data from the shift register is set on the basis of address data supplied from an address generator 42. In the case of the present embodiment, the shift register forming the interleave unit 41 is divided to a former half and a latter half. From the two shift registers, data are read out simultaneously in an order corresponding to each interleave pattern. From the interleave unit 41, data of two series are simultaneously outputted.

The transmission data of the two series interleaved by the interleave unit 41 are simultaneously supplied to a differential encoder 43, in which differential encoding processing is conducted to thereby produce differential encoded transmission data TA and TB. Respective differential encoded transmission data TA and TB are supplied to one input terminal of a selector 44. Furthermore, the received data Rx supplied from the analog-digital converter 30 to an input terminal 10b is supplied to a second input terminal of the selector 44. The selector 44 is supplied with a transmission/reception selection signal from the link layer processor 21 via a terminal 10c. When transmission is selected by this selection signal, the selector 44 selects the transmission data supplied to the first input terminal, and outputs it. When reception is selected by the selection signal, the selector 44 selects the received data supplied to the second input terminal, and outputs it.

The data selected and outputted by the selector 44 (transmission data or received data) is supplied to an input register 47 provided in an input part of a Fourier transform circuit 48 via multipliers 45 and 46. The multiplier 45 is supplied with the received data Rx or the first transmission data TA. The multiplier 45 multiplies Rx or TA by correction data supplied from an input terminal 45a. The multiplier 46 is supplied with the second transmission data TB. The multiplier 46 multiplies TB by correction data supplied from an input terminal 46a. The correction data supplied to the input terminals 45a and 46a at the time of transmission are coefficient data for conducting aperture distortion correction and coefficient data for correcting the phase distortion and group delay distortion of the filter. The correction data supplied to the input terminals 45a at the time of reception is coefficient data for conducting a frequency error. These correction data are generated by a side (not illustrated) which controls the communication state.

The input register 47 supplied with the multiplication outputs from the multipliers 45 and 46 is a register in which data of as many stages as points converted by the Fourier transform circuit 48 (here, N points, where N is an integer, such as 64 points) can be set. In this case, in the case of transmission data, data of the two series are simultaneously supplied to the input register 47. For example, data of a first series is set in the former half of the register 47, and data of a second series is set in the latter half of the register 47. The data which has been set in the input register 47 is supplied to the Fourier transform circuit 48 at predetermined timing, in which Fourier transform processing or inverse Fourier transform processing are conducted. The Fourier transform circuit 48 is supplied with the transmission/reception selection signal from the link layer processor 21 via the terminal 10c. When transmission is selected by this selection signal, computation processing of inverse fast Fourier transform is conducted by the Fourier transform circuit 48. When reception is selected by the selection signal, computation processing of fast Fourier transform is conducted by the Fourier transform circuit 48.

In the computation processing using the inverse fast Fourier transform at the time of transmission, orthogonal transform processing for transforming data arranged on the time axis to data arranged on the frequency axis is conducted. For example, if transform processing of N points (here, 64 points) is conducted, the transformed data is set in an output register 49 as parallel data of N points (64 points).

In the computation processing using the fast Fourier transform at the time of reception, orthogonal transform processing for transforming data arranged on the frequency axis to data arranged on the time axis is conducted. For example, if transform processing of N points (here, 64 points) is conducted, the transformed data is set in the output register 49 as parallel data of N points (64 points).

The parallel data subjected to the inverse Fourier transform or Fourier transform in the Fourier transform circuit 48 and set in the output register 49 is read out in an order based upon the address data supplied from an address generator 50, and converted to serial data. The address generator 50 is supplied with the transmission/reception selection signal from the link layer processor 21 via the terminal 10c. When transmission is selected by this selection signal, the address generator unit 50 supplies address data set for transmission to the output register 49. When reception is selected by the selection signal, the address generator unit 50 supplies address data set for reception to the output register 49.

The order which is set in the address generator 50 of the present example for transmission is formed so as to specify addresses of N series (64 series) of the output register 49 one after another. When parallel data of, for example, 64 series is represented by $y_0$ to $y_{63}$, however, the same address is repeatedly specified in the present example for 4 head series, i.e., $y_{60}$ to $y_{63}$ and 4 tail series, i.e., $y_0$ to $y_3$. For those series, therefore, the same data is repeatedly outputted. For 8 head samples and 8 tail samples, data of repetitive waveforms are obtained. Transmission data $T_x'$ having guard intervals added thereto is thus obtained.

The order which is set in the address generator 50 of the present example for reception is formed so as to specify addresses of N series (64 series) of the output register 49 in an order corresponding to a de-interleave pattern for recovering from the interleave conducted on the transmission data and restoring the original state. As for the configuration for generating the address data in such an order, the address data may be generated by, for example, count processing in a counter, or address data may be set in a register beforehand in an order corresponding to the interleave pattern. In the case of the present example, data is outputted as serial data of one series at the time of transmission, and data is outputted as serial data of two series when the data is outputted from the output register 49 at the time of reception.

The serial data of one series outputted from the output register 49 at the time of transmission in the order specified by the address generator 50 is supplied directly to a differential decoder 52. As for serial data of the two series outputted from the output register 49 at the time of reception, data of a first series is supplied to the differential decoder 52 via a selector 51, and data of a second series is supplied directly to the differential decoder 52. The selector 51 is supplied with the transmission/reception selection signal from the link layer processor 21 via the terminal 10c. When transmission is selected by this selection signal, the selector 51 outputs window coefficient data supplied from an input terminal 51a, while when reception is selected by the selection signal, the selector 51 selects the supplied received data and supplies the selected received data to the differential decoder 52. The window coefficient data is used to multiply the OFDM modulated signal of one unit and thereby conduct window processing for band limiting.

Figure 1:
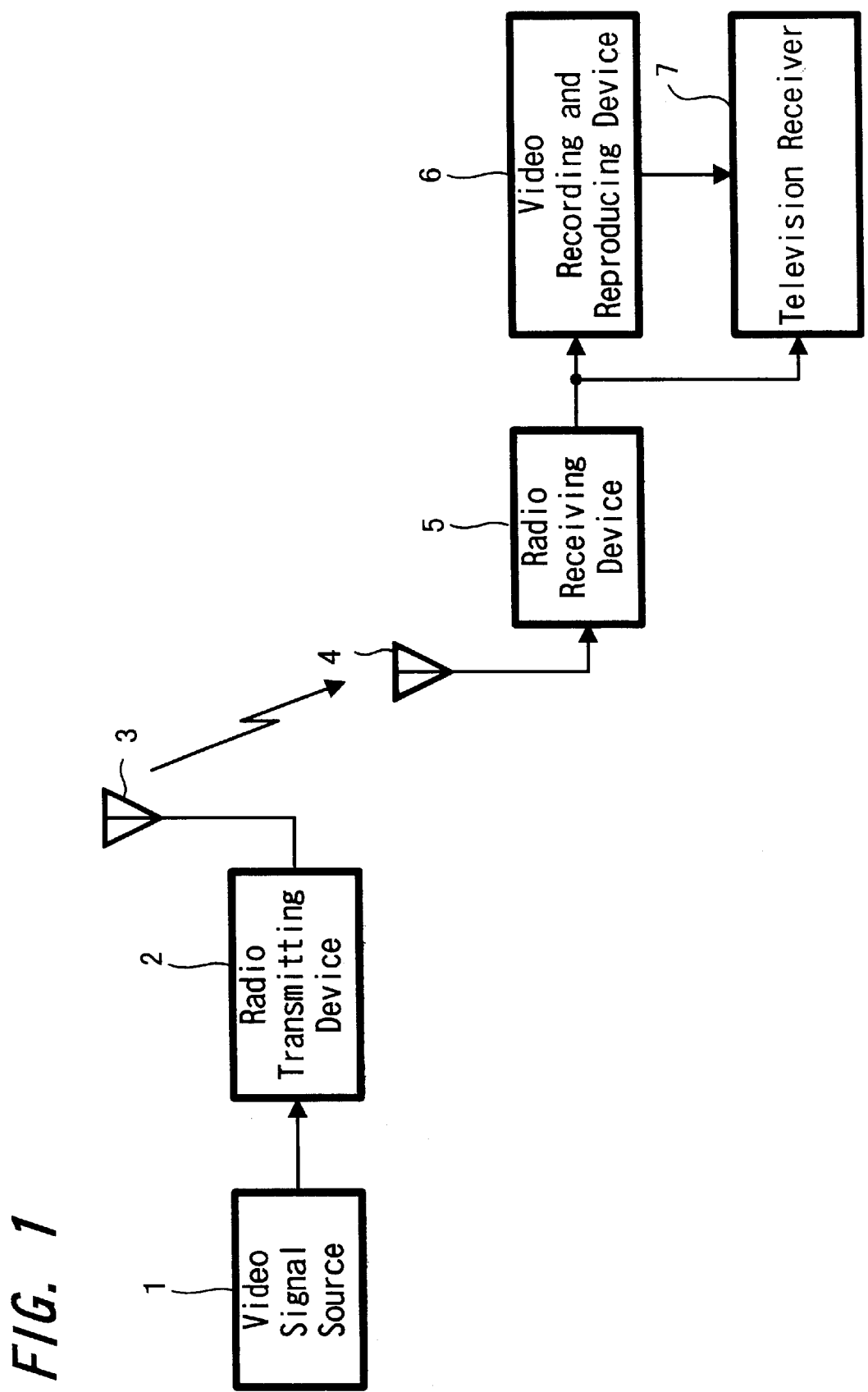
FIG. 1 is a block diagram showing an example of the configuration of a radio communication system.
Figure 2:
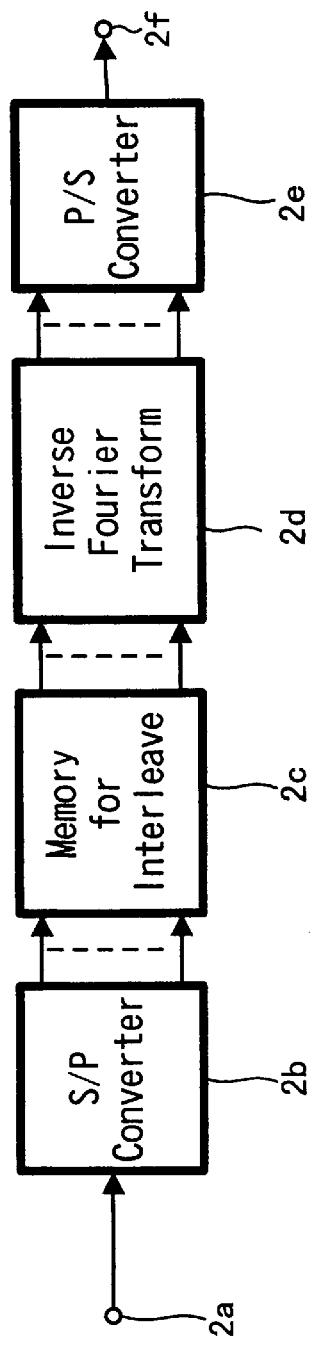
FIG. 2 is a block diagram showing an example of a conventional configuration for generating an interleaved OFDM modulated signal.
Figure 3:
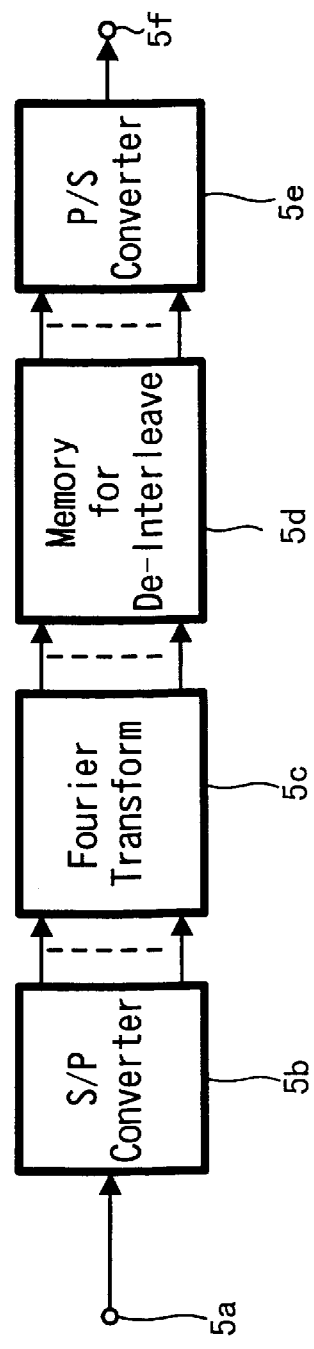
FIG. 3 is a block diagram showing an example of a conventional configuration for demodulating an interleaved OFDM modulated signal.

In the differential decoder 52, complex multiplication of supplied transmission data and the window coefficient data is conducted at the time of transmission. Resultant data of the complex multiplication is supplied to an output terminal 10d of OFDM modulated transmission data Tx', and supplied to the digital-analog converter 22 shown in FIG. 1 via the terminal 10d. Furthermore, by multiplication of the serial data of the two series supplied to the differential decoder 52 at the time of reception, differential decoding processing is conducted. Received data Rx' differential decoded in the differential decoder 52 is supplied to an output terminal 10e, and supplied to the link layer processor 21 shown in FIG. 4 via the terminal 10e.

Other portions are formed in the same way as the apparatus described above with reference to the first and second embodiments. The OFDM modulated signal generated by the inverse Fourier transform and demodulated by the Fourier transform processing is also the same as the OFDM modulated signal of the first embodiment described above by referring to FIG. 6.

Owing to the configuration of the present embodiment, the processing for generating the OFDM modulated signal at the time of transmission and the processing for demodulating the OFDM signal at the time of reception are conducted by the OFDM modulator/demodulator 10 which is a common circuit in the same way as the first embodiment described above. It is thus unnecessary to prepare separate circuits for modulation of the OFDM signal and for demodulation of the OFDM signal. Therefore, the configuration of the communication apparatus for transmitting and receiving the OFDM signal can be simplified. And in the case of the present embodiment, the data of the two series are simultaneously set in the input register 47 of the Fourier transform circuit 48, at the time of processing of the transmission data, in the same way as the case of the second embodiment. As a result, the time for setting the transmission data in the input register 47 can be reduced to half as compared to the prior art. The time required for the OFDM modulation processing of the transmission data can be shortened correspondingly.

Furthermore, in the case of the present embodiment, the multipliers 45 and 46 for multiplying the data by coefficient data for correction are provided before the input register of the Fourier transform circuit 48. In each of the multipliers, data is multiplied by the correction data for transmission or the correction data for reception. Therefore, the characteristic correction of the transmission data and the characteristic correction of the received data can be conducted concurrently with the modulation or demodulation of the OFDM signal. Furthermore, as for the transmission data, complex multiplication of the transmission data and the window coefficient data selected by the selector 51 is conducted in the differential decoder 52. Thus the transmission data multiplied by the window coefficient is obtained. The processing for multiplying the transmission data by the window coefficient can be conducted by using the differential decoder used at the time of reception. As a result, the circuit configuration can be further simplified.

As for the data for characteristic correction multiplied in the multipliers 45 and 46 described with reference to the present embodiment, an example has been described. Other correction data may be multiplied. In the Fourier transform circuit described with reference to the embodiments, transform processing of 64 points is conducted. As a matter of course, however, a Fourier transform circuit having a different number of transform points may be used.

In accordance with the present invention, the transmission processing and reception processing of the OFDM modulated signal can be conducted by a circuit of a simple configuration having only one set of Fourier transform means. The configuration of the communication apparatus for transmitting and receiving the OFDM modulated signal can be simplified. Especially, the processing for adding guard intervals to the transmission signal at the time of transmission and the transmission for restoring the data arrangement to the original state at the time of reception can be conducted in the output processing of the Fourier transform means. Dedicated circuits for conducting respective processing operations are not required. Accordingly, the circuit configuration can be simplified.

Also, in accordance with the present invention, a communication apparatus includes an interleave means for interleaving transmission data in a predetermined arrangement, a differential encoding means for conducting differential encoding on the transmission data interleaved by the interleave circuit and supplying the differential encoded transmission data to the selector, and a differential decoder for conducting differential decoding on received data outputted by the Fourier transform circuit. As a result, all of the interleave processing and differential encoding processing at the time of transmission, and the de-interleave processing and the differential decoding processing at the time of reception are conducted by circuits connected before and after one set of Fourier transform means. As a result, the circuit configuration can be further simplified.

Further, in accordance with the present invention, a communication apparatus has such a configuration that the transmission data is converted to data of two series by the interleave circuit, and the data of the two series are subjected to differential encoding in the differential encoder, and then set in the input register of the Fourier circuit in parallel. As a result, the time required for setting the transmission data in the Fourier transform circuit at the time of transmission can be shortened. And the time required for generating the OFDM modulated signal for transmission can be shortened.

Furthermore, in accordance with the present invention, a communication apparatus further includes a first multiplier disposed in a stage preceding the input register of the Fourier transform circuit to multiply data by correction data for transmission and correction data for reception, and a second multiplier for multiplying transmission data outputted from the output register of the Fourier transform circuit by window coefficient. As a result, the processing for correcting the transmission data and the received data can also be conducted at the same time. In addition, the multiplication processing of the window coefficient at the time of transmission can also be conducted. Therefore, the circuit configuration can be further simplified.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A modulator/demodulator for modulating and demodulating a signal, comprising:
    interleave process means for interleaving input transmission data and producing interleaved transmission data;
    selection means for selecting one of the interleaved transmission data and reception data;
    Fourier transform means including an input register for storing the transmission data or the reception data selected by the selection means, a Fourier-transform processing section for performing inverse-Fourier-transform processing and Fourier-transform processing on the transmission data and the reception data, respectively, that are fetched from the input register, and an output register for storing the transmission data and the reception data processed at said Fourier-transform processing section and
    read control means for reading the transmission data so that a beginning part and an end part of the transmission data are repeatedly read when said output register stores the inverse-Fourier-transformed transmission data and for reading the reception data so as to de-interleave the reception data when said output register stores the Fourier-transformed reception data.

2. The modulator/demodulator as claimed in claim 1, wherein the output register of the Fourier transform means outputs serial data of two series at a time of data reception.

3. The modulator/demodulator according to claim 2 further comprising differential decode means for differential-decoding the serial data of two series outputted from the output register of the Fourier transform means at the time of data reception.

4. The modulator/demodulator as claimed in claim 1, further comprising differential encode means for differential encoding the interleaved transmission data, wherein the interleave process means arranges the transmission data as data of two series, and wherein the data of two series are differential-encoded by the differential encode means and then set in the input register of the Fourier transform means in parallel to each other.

5. The modulator/demodulator according to claim 4 further comprising multiplier means provided at a preceding stage of the input register of the Fourier transform means for multiplying correction data for transmission and correction data for reception.

6. The modulator/demodulator according to claim 5, further comprising selector means for applying window coefficient data to the transmission data outputted from the output register of the Fourier transform means.

7. A method of modulating/demodulating a signal comprising the steps of:
    selecting one of transmission data and reception data;
    setting data selected by the selecting step in an input register; processing the data set in the input register by one of Fourier-transforming and inverse-Fourier-transforming; and setting data of an arbitrary integer N point, which is one of Fourier-transformed and inverse-Fourier-transformed, in an output register; and
    reading the data of the arbitrary integer N point set in the output register in first and second orders wherein, at a time of transmission, transmission data is selected by the selecting step, reverse-Fourier-transformed and read out in the first order which adds a guard interval to the transmission data, while
    at a time of reception, reception data is selected by the selecting step, Fourier-transformed and read out in the second order which de-interleaves the reception data.

8. A modulator/demodulator for modulating and demodulating transmission data and reception data, respectively, comprising:
    interleave process means for interleaving input transmission data and producing interleaved transmission data;
    selecting means for selecting one of the interleaved transmission data and input reception data
    Fourier transform means including an input register for storing the transmission data or the reception data selected by said selecting means and including a Fourier transform processing section for performing an inverse Fourier transform and a Fourier transform for the transmission data and the reception data, respectively, that are fetched from said input register and an output register for storing the transmission data and the reception data processed at said Fourier transform processing section;
    read control means for issuing an order to read the transmission data or the reception data stored in said output register of said Fourier transform means; and
    multiplier means provided at a preceding stage of said input register of said Fourier transform means for multiplying correction data for transmission and correction data for reception.

9. The modulator/demodulator according to claim 8, further comprising selector means for applying window coefficient data to the transmission data output from said output register of said Fourier transform means.

10. A method of modulating and demodulating a signal comprising the steps of:

interleaving input transmission data and producing interleaved transmission data;

selecting one of the interleaved transmission data and reception data;

storing in an input register the transmission data or the reception data selected in said step of selecting;

performing inverse-Fourier-transform processing and Fourier-transform processing on the transmission data and the reception data, respectively, that are fetched from the input register;

storing the transmission data and the reception data that have been inverse-Fourier-transform processed and Fourier-transform processed, respectively, in an output register;

reading repeatedly a beginning part and an end part of the transmission data when the output register stores the inverse-Fourier transformed data; and reading the reception data from the output register so as to de-interleave the reception data when the output register stores the Fourier transformed reception data.

11. The method according to claim 10 further comprising the step of multiplying correction data for transmission and correction data for reception at a stage preceding the input register.

12. The method according to claim 11 further comprising the step of multiplying the transmission data output from the output register by a window coefficient.

* * * * *